(12) United States Patent
Lee (10) Patent No.: US 9,603,391 B1
(45) Date of Patent: Mar. 28, 2017

(54) METHOD OF FORMING AN UNDERWIRE CHANNEL OF A BRA

(71) Applicant: DOMOHO BEST TEXTILE CO., LTD., Taichung (TW)

(72) Inventor: Chen-Chiang Lee, Taipei (TW)

(73) Assignee: Domoho Best Textile Co., Ltd., Taichung (TW)

( * ) Notice: Subject to any disclaimer, the term of this patent is extended or adjusted under 35 U.S.C. 154(b) by 0 days.

(21) Appl. No.: 15/075,323

(22) Filed: Mar. 21, 2016

(51) Int. Cl.
| | | |
|---|---|---|
| *A41C 3/00* | (2006.01) | |
| *A41C 5/00* | (2006.01) | |
| *B29C 51/08* | (2006.01) | |
| *B29C 51/12* | (2006.01) | |
| *B29C 51/14* | (2006.01) | |
| *B29K 101/12* | (2006.01) | |
| *B29K 105/00* | (2006.01) | |
| *B29L 31/48* | (2006.01) | |

(52) U.S. Cl.
CPC ........... *A41C 3/0014* (2013.01); *A41C 5/00* (2013.01); *B29C 51/082* (2013.01); *B29C 51/12* (2013.01); *B29C 51/145* (2013.01); *B29K 2101/12* (2013.01); *B29K 2105/256* (2013.01); *B29L 2031/4885* (2013.01)

(58) Field of Classification Search
CPC ........... A41C 5/005; A41C 3/00; A41C 3/122; A41C 3/10
USPC .............................. 450/39, 54–57, 41–45, 92
See application file for complete search history.

(56) References Cited

U.S. PATENT DOCUMENTS

| | | | | |
|---|---|---|---|---|
| 2004/0142633 | A1* | 7/2004 | Luk | A41C 5/005 450/39 |
| 2006/0105674 | A1* | 5/2006 | Lau | A41C 3/122 450/39 |
| 2008/0096465 | A1* | 4/2008 | Liu | A41C 5/005 450/39 |
| 2009/0181599 | A1* | 7/2009 | Farmer | A41C 3/10 450/39 |
| 2010/0124869 | A1* | 5/2010 | Liu | A41C 5/005 450/39 |
| 2010/0165017 | A1* | 7/2010 | Lester | B41J 29/393 347/5 |
| 2010/0317256 | A1* | 12/2010 | Zhang | A41C 3/122 450/38 |
| 2014/0342637 | A1* | 11/2014 | Laflamme | A41C 5/005 450/39 |
| 2014/0370784 | A1* | 12/2014 | Chen | A41C 5/005 450/41 |

(Continued)

*Primary Examiner* — Gloria Hale
(74) *Attorney, Agent, or Firm* — Alan D. Kamrath; Kamrath IP Lawfirm, P.A.

(57) ABSTRACT

A method of forming an underwire channel of a bra cup contains the steps of: A. providing a first cup layer, a second cup layer, and a channel forming rib; B. stacking a first thermoformed layer of the first cup layer and a second thermoformed layer of the second cup layer together; C. providing a forming mold which includes a first part and a second part each having a cavity; D. heating the forming mold with the first cup layer, the second cup layer, and the channel forming rib stacked together in the cavity; E. opening the forming mold to form a cup portion and a semifinished part of an arcuate underwire channel; F. removing the channel forming rib out of the underwire channel by pulling the extension; G. trimming the semifinished part to form a finished cup; and H. finishing a bra cup.

7 Claims, 12 Drawing Sheets

(56) References Cited

U.S. PATENT DOCUMENTS

2015/0157061 A1* 6/2015 Zhang ...................... A41C 5/00
450/92

* cited by examiner

METHOD OF FORMING AN UNDERWIRE CHANNEL OF A BRA

BACKGROUND OF THE INVENTION

Field of the Invention

The present invention relates to a method of forming an underwire channel of a bra cup which fixes and removes an underwire made of steel or fiber-reinforced plastic (FRP) based on using requirements, after forming the underwire channel.

Description of the Prior Art

A conventional bra cup is made of fabric and contains a cup portion made of thermoformed material, such as foam or cotton fiber, to shape a support portion. Furthermore, the bra cup is completely made of thermoformed material, such as foam or cotton fiber, and the bra cup also contains an underwire made of steel or plastics material.

Another bra cup is made of fabric and contains a cup portion, an arcuate bag sewed on a bottom of the cup portion, and a steel underwire accommodated in the cup portion. An opening of the arcuate bag is sewn to fix the steel underwire. However, such a manufacturing method spends high production cost, and the steel underwire is arcuate. Furthermore, the fabric causes wrinldes in a sewing process.

Another conventional bra cup contains a cup portion made of thermoformed material, such as foam or cotton fiber. A profile of the cup portion is formed by a mold which is heated, and the mold heats and presses two flat foam/cotton fiber pieces to shape the cup portion into a profile which corresponds to a breast. Then, a steel underwire is fixed between the two flat foam/cotton fiber pieces, and the two fiat foam/cotton fiber pieces are adhered together after the mold heats and presses the two flat foam/cotton fiber pieces, thus covering and limiting the steel underwire between the two fiat foam/cotton fiber pieces.

When a user is inspected by a customs officer, she will be inspected carefully, because her bra cup contains the steel underwire. To avoid such a problem, the steel underwire is replaced by an underwire made of plastic material, but this underwire cannot sufficiently support the cup portion of the bra cup.

Accordingly, it is an important issue to manufacture a bra cup which contains a cup portion made of foam or cotton fiber and contains a steel underwire or an underwire made of plastic material, so that the user replaces and chooses the underwire of steel or plastic material according to using requirements.

The present invention has arisen to mitigate and/or obviate the afore-described disadvantages.

SUMMARY OF THE INVENTION

The primary objective of the present invention is to provide a method of forming a support of a bra cup which forms an underwire channel having an opening and located on a bottom of a finished cup, and an underwire is inserted into the underwire channel in any manufacturing process, so that the bra cup passes customs inspection.

Another objective of the present invention is to provide a method of forming a support of a bra cup in which the underwire made of steel or fiber-reinforced plastic (FRP) is replaceable based on using requirements.

To obtain the above objectives, a method of forming a support of a bra cup provided by a preferred embodiment of the present invention contains the steps of:

A. providing a first cup layer, a second cup layer, and a forming rib. The first cup layer includes a surface cloth and a first thermoformed layer, and the second cup layer includes a second thermoformed layer and a lining cloth. The first thermoformed layer and the second thermoformed layer are made of specific material to be flexible when heated and shaped when cooled. The forming rib is arcuate and includes an extension extending outwardly from one end thereof, and the forming rib also includes a covering layer corresponding to a profile of the forming rib;

B. stacking the first thermoformed layer 12 of the first cup layer and the second thermoformed layer of the second cup layer together, the forming rib is fixed between the first thermoformed layer and the second thermoformed layer, and the extension of the forming rib extends out of the first cup layer and the second cup layer;

C. providing a forming mold, with the forming mold including a first part and a second part, with each of the first part and the second part having a cavity corresponding to a profile of a breast and has a trench defined on a peripheral side of the cavity;

D. heating the forming mold, with the first cup layer, the second cup layer, and the forming rib stacked together and are mounted in the cavity of each of the first part and the second part, with the forming mold then locked and pressing the first cup layer and the second cup layer at a high temperature and pressure, with the covering layer of the forming rib covered between the first cup layer and the second cup layer and connected with the first thermoformed layer and the second thermoformed layer;

E. opening the forming mold to form a cup portion and a semifinished part of an arcuate underwire channel, with the covering layer of the forming rib accommodated in the underwire channel, with the extension extending out of the underwire channel;

F. removing the forming rib out of the underwire channel by pulling the extension of the forming rib to form a hollow space in the underwire channel and an opening on one side of the underwire channel;

G. trimming the semifinished part to form a finished cup; and

H. finishing a bar cup.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
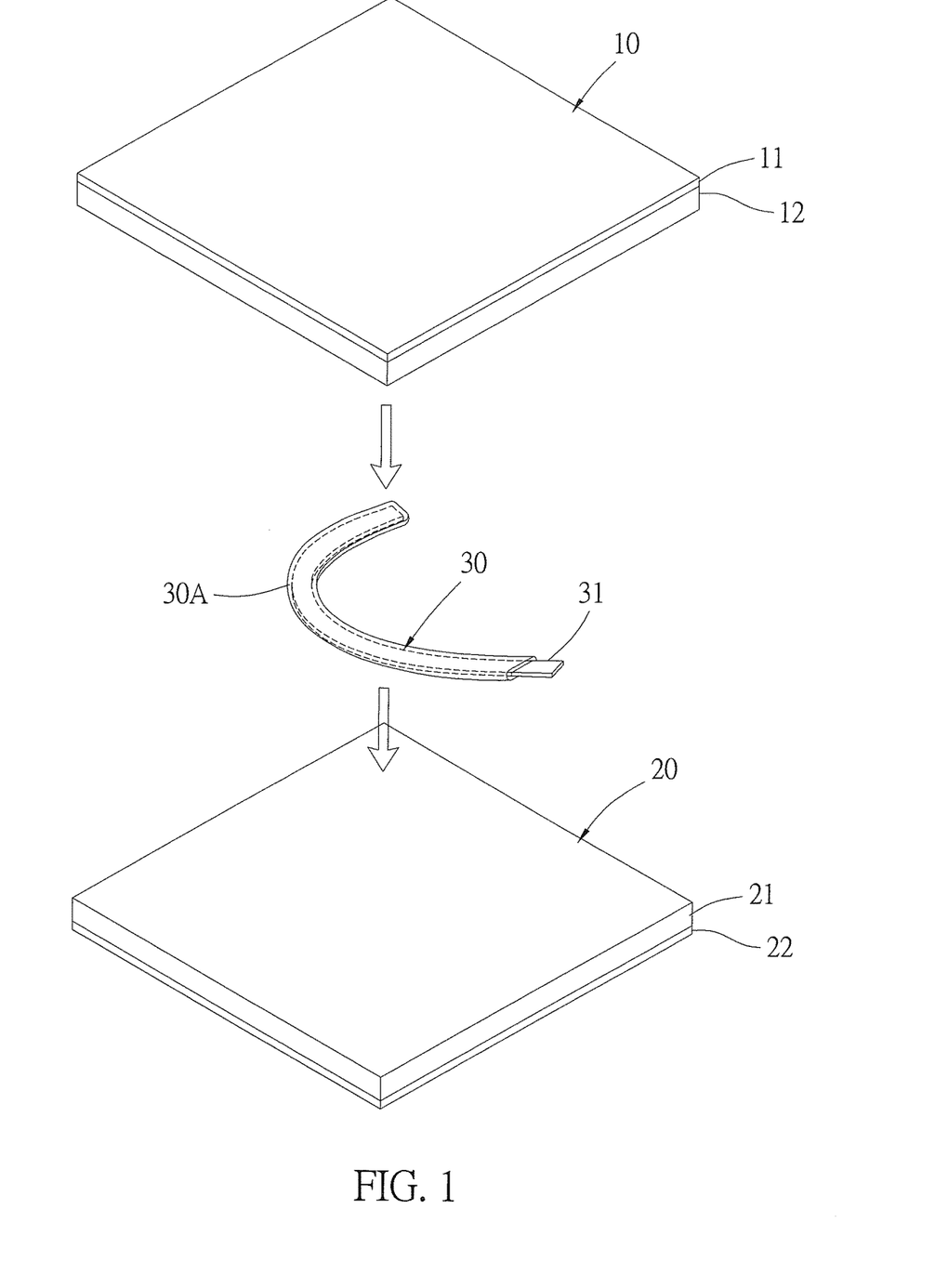
FIG. 1 is a perspective view showing step A of a method of forming a support of a bra cup in accordance with a preferred embodiment of the present invention.

A method of forming an underwire channel of a bra cup according to a preferred embodiment of the present invention comprises the steps of:

A. providing a first cup layer 10, a second cup layer 20, and a forming rib 30, as shown in FIG. 1. The first cup layer 10 includes a surface cloth 11 and a first thermoformed layer 12, and the second cup layer 20 includes a second thermoformed layer 21 and a lining cloth 22. The first thermoformed layer 12 and the second thermoformed layer 21 are made of foam or cotton fiber to be flexible when heated and shaped when cooled. The forming rib 30 is arcuate and includes an extension 31 extending outwardly from one end thereof. The forming rib 30 also includes a covering layer 30A corresponding to a profile of the forming rib 30; pg,7

Figure 2:
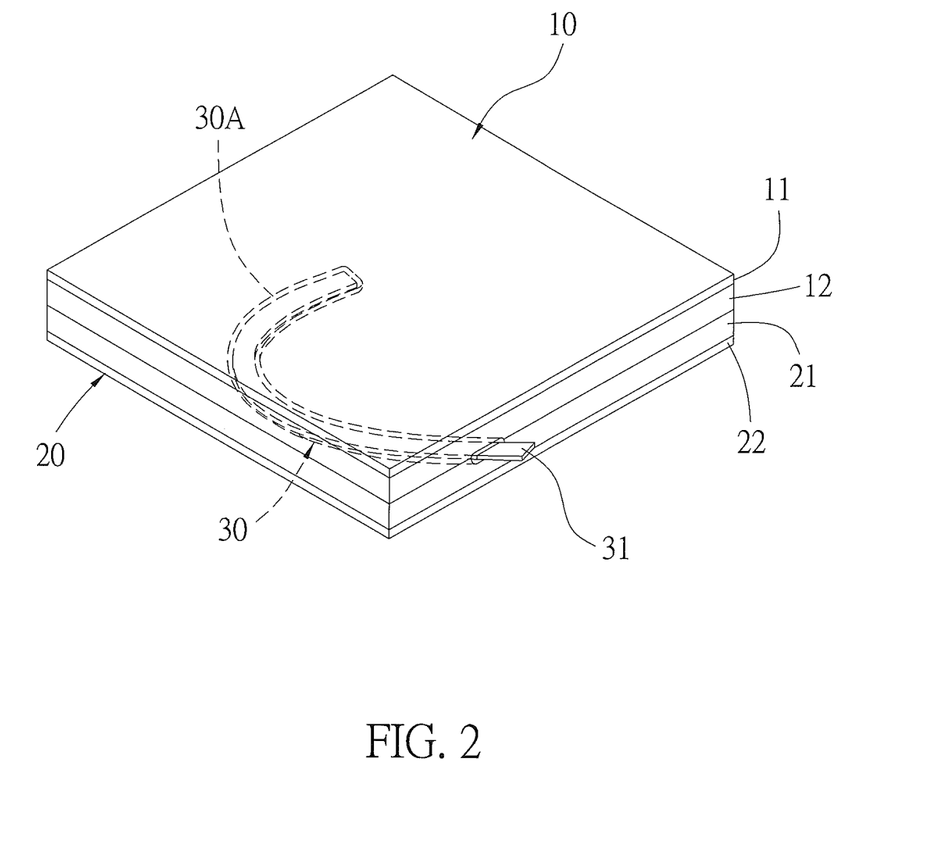
FIG. 2 is a perspective view showing step B of the method of forming the support of the bra cup in accordance with the preferred embodiment of the present invention.
Figure 3:
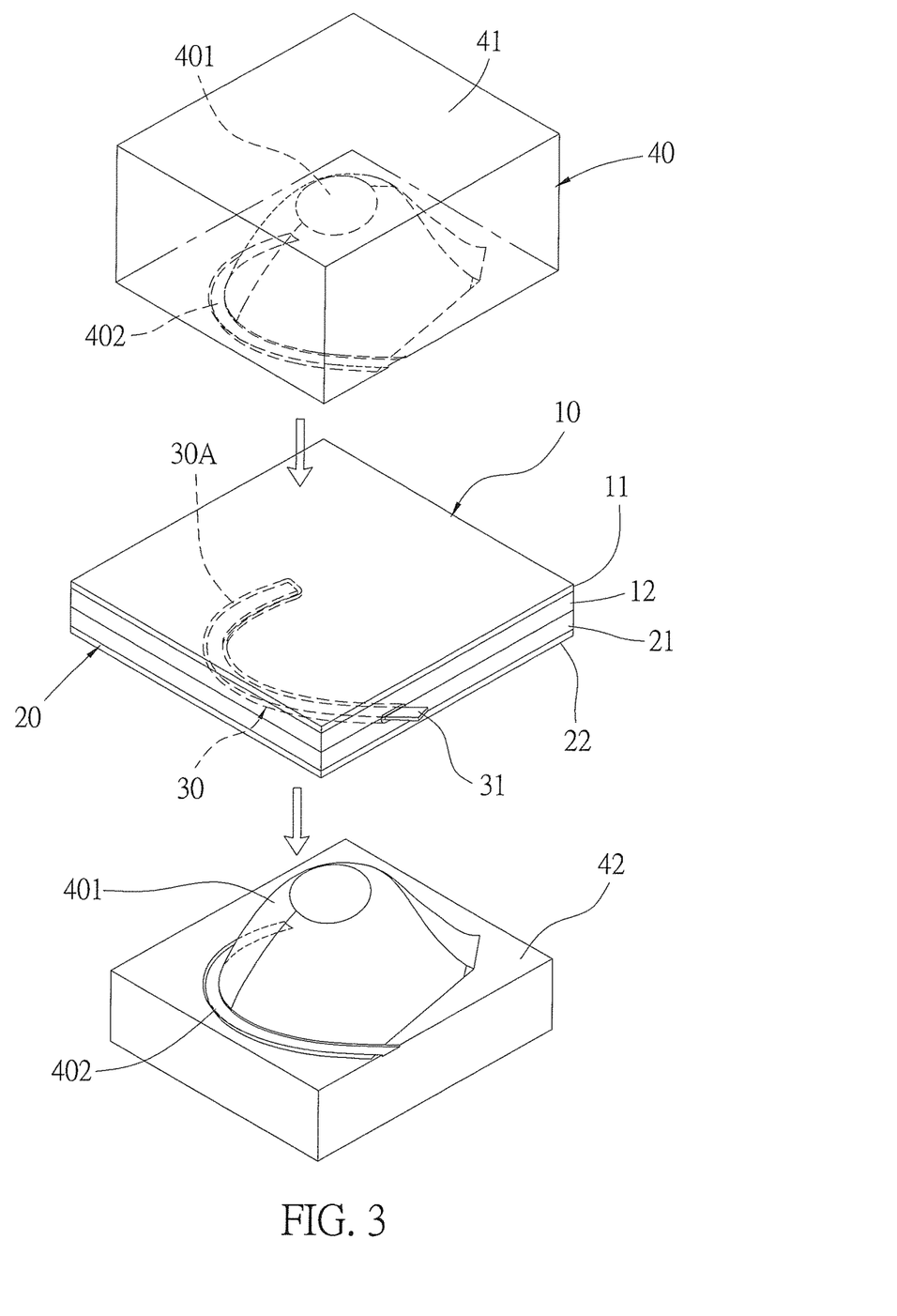
FIG. 3 is a perspective view showing step C of the method of forming the support of the bra cup in accordance with the preferred embodiment of the present invention.
Figure 4:
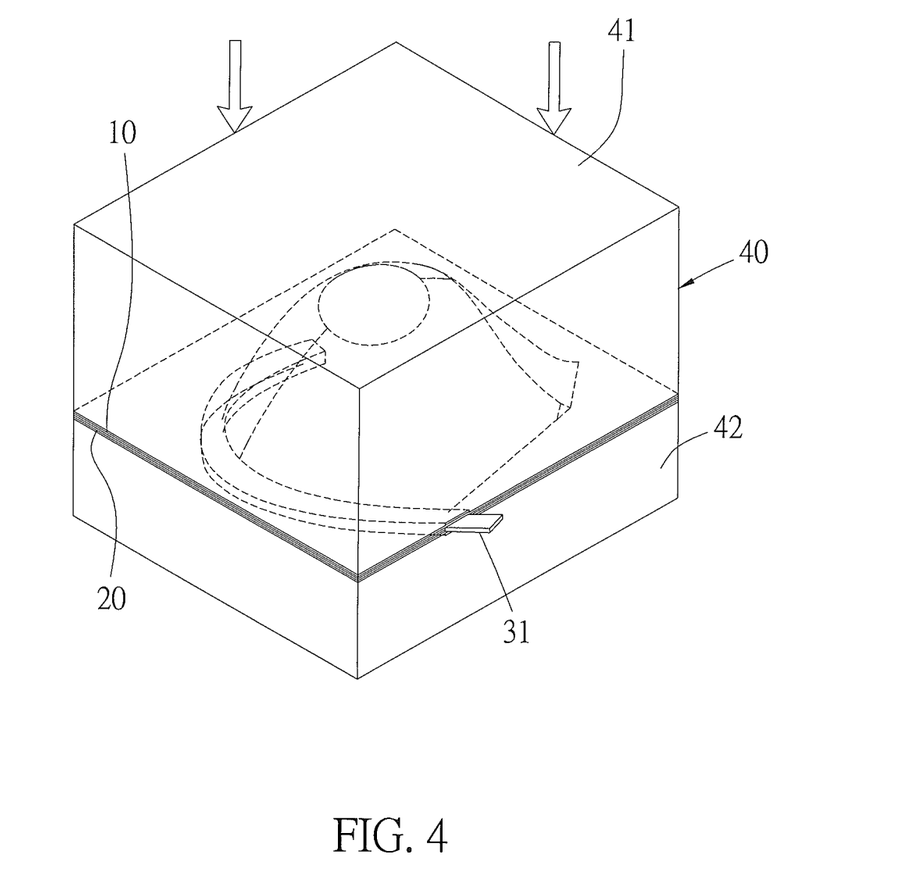
FIG. 4 is a perspective view showing step D of the method of forming the support of the bra cup in accordance with the preferred embodiment of the present invention.
Figure 5:
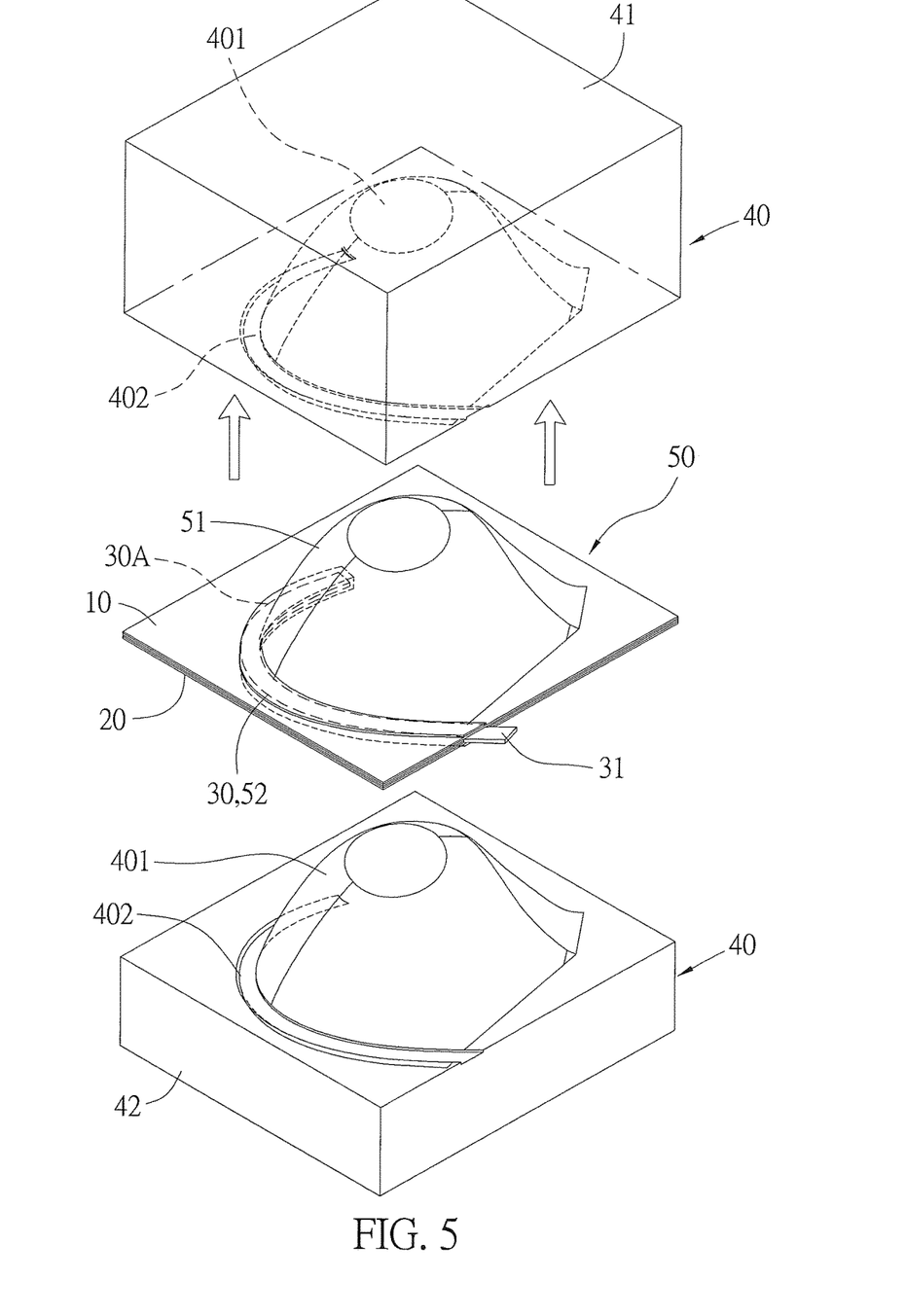
FIG. 5 is a perspective view showing step of the method of forming the support of the bra cup in accordance with the preferred embodiment of the present invention.
Figure 6:
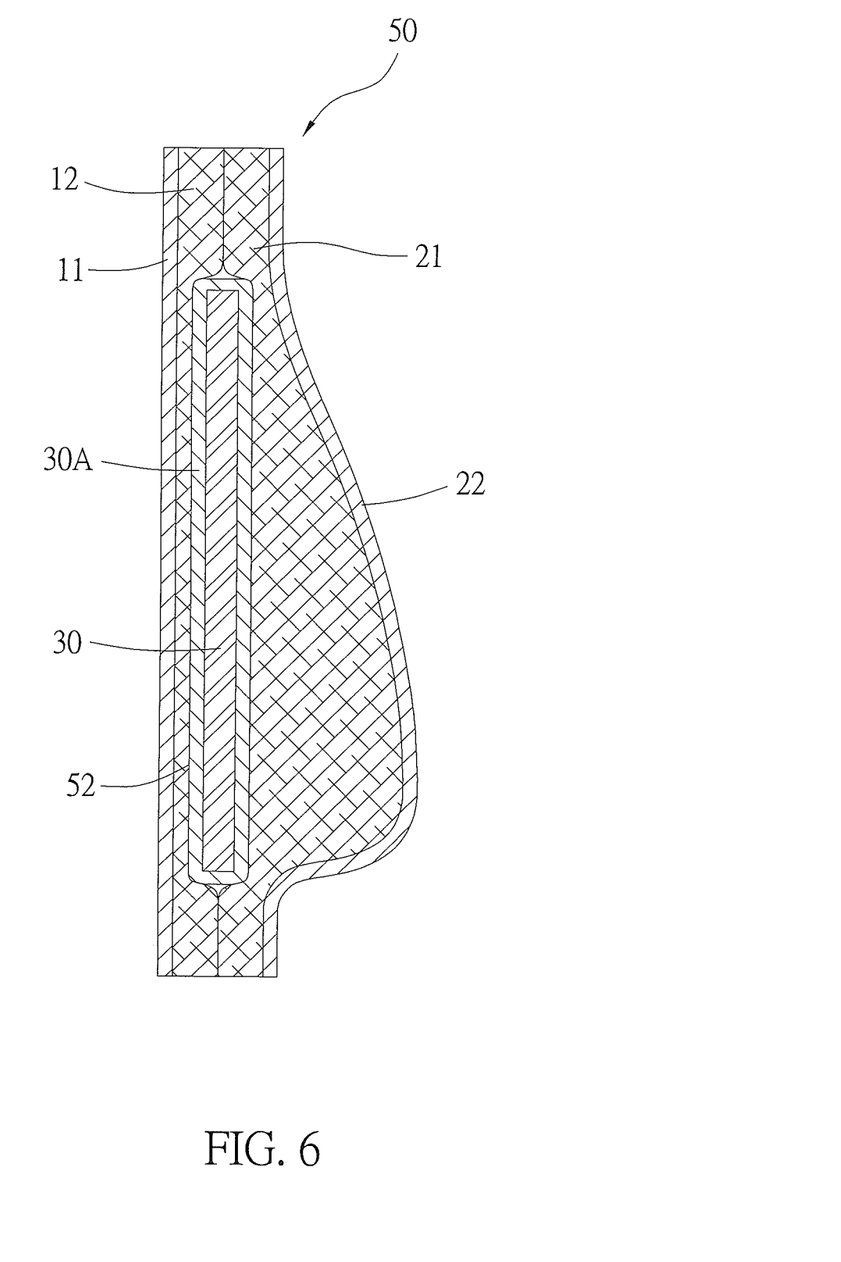
FIG. 6 is a cross sectional view showing the operation of the method of forming the support of the bra cup in accordance with the preferred embodiment of the present invention.
Figure 7:
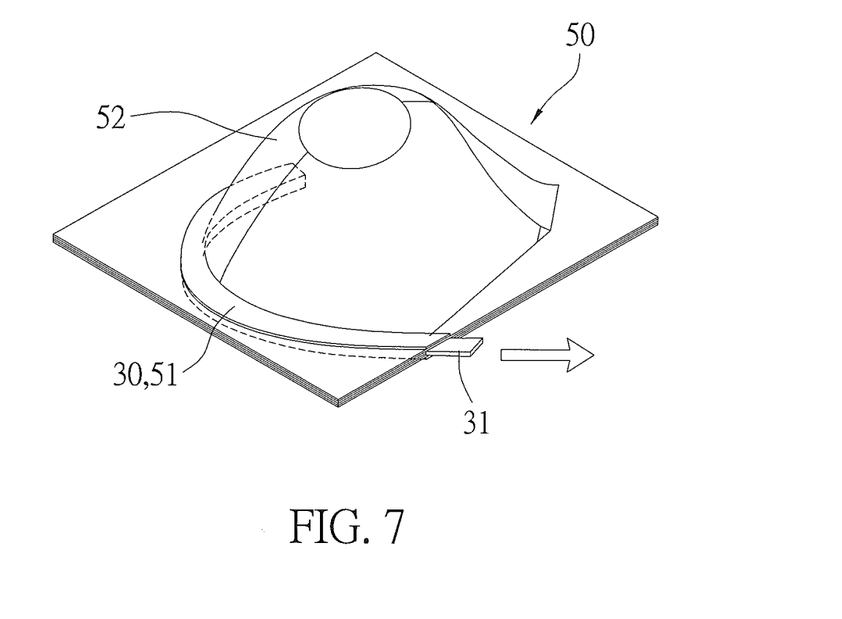
FIG. 7 is a perspective view showing step F of the method of forming the support of the bra cup in accordance with the preferred embodiment of the present invention.
Figure 8:
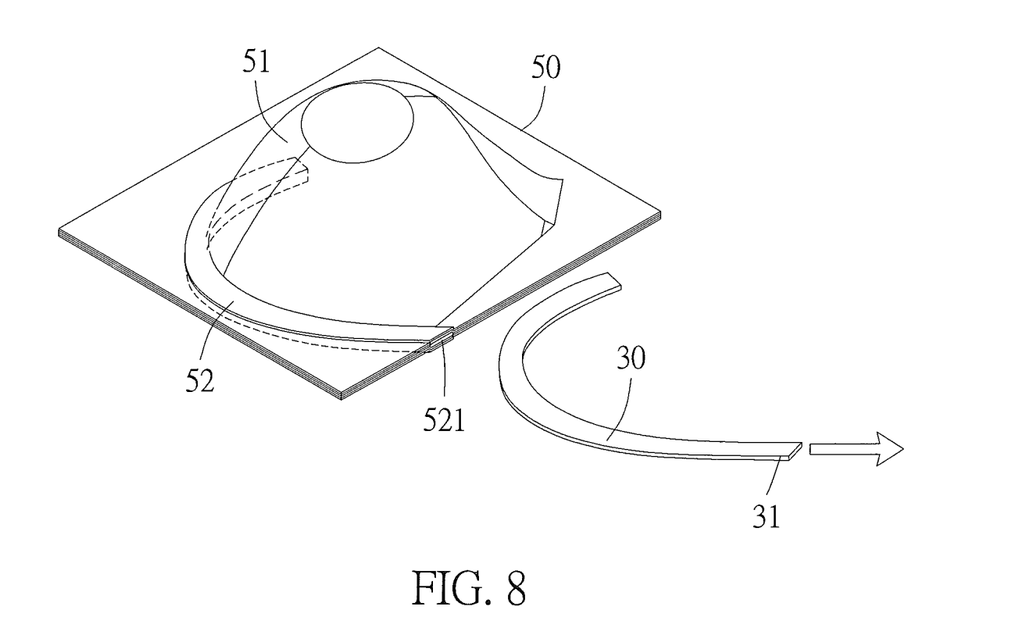
FIG. 8 is another perspective view showing step F of the method of forming the support of the bra cup in accordance with the preferred embodiment of the present invention.
Figure 9:
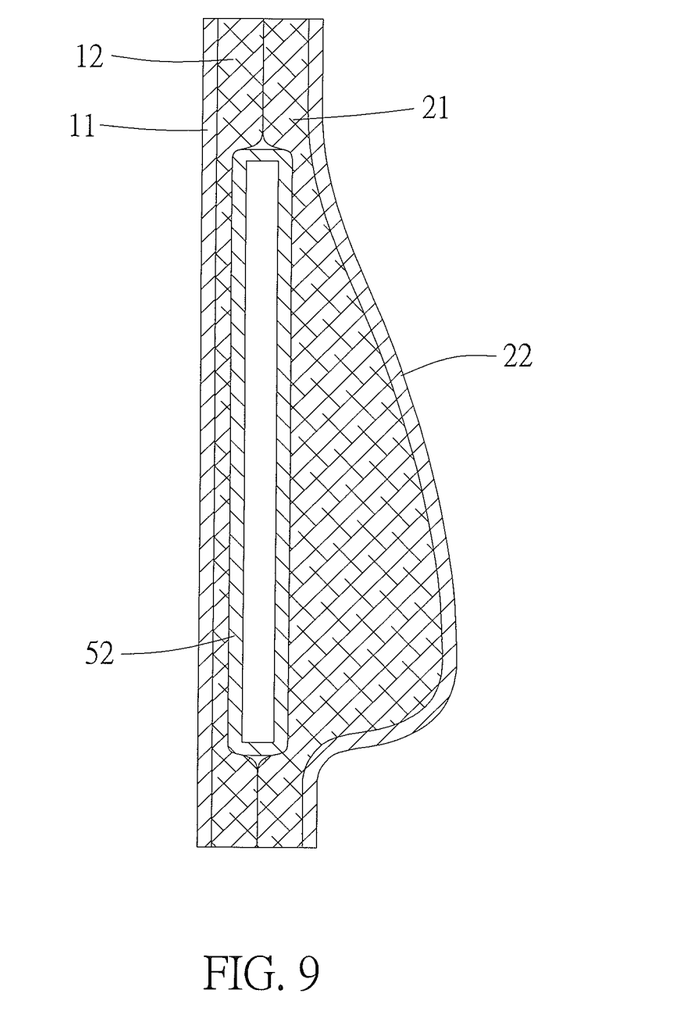
FIG. 9 is another cross sectional view showing the operation of the method of forming the support of the bra cup in accordance with the preferred embodiment of the present invention.
Figure 10:
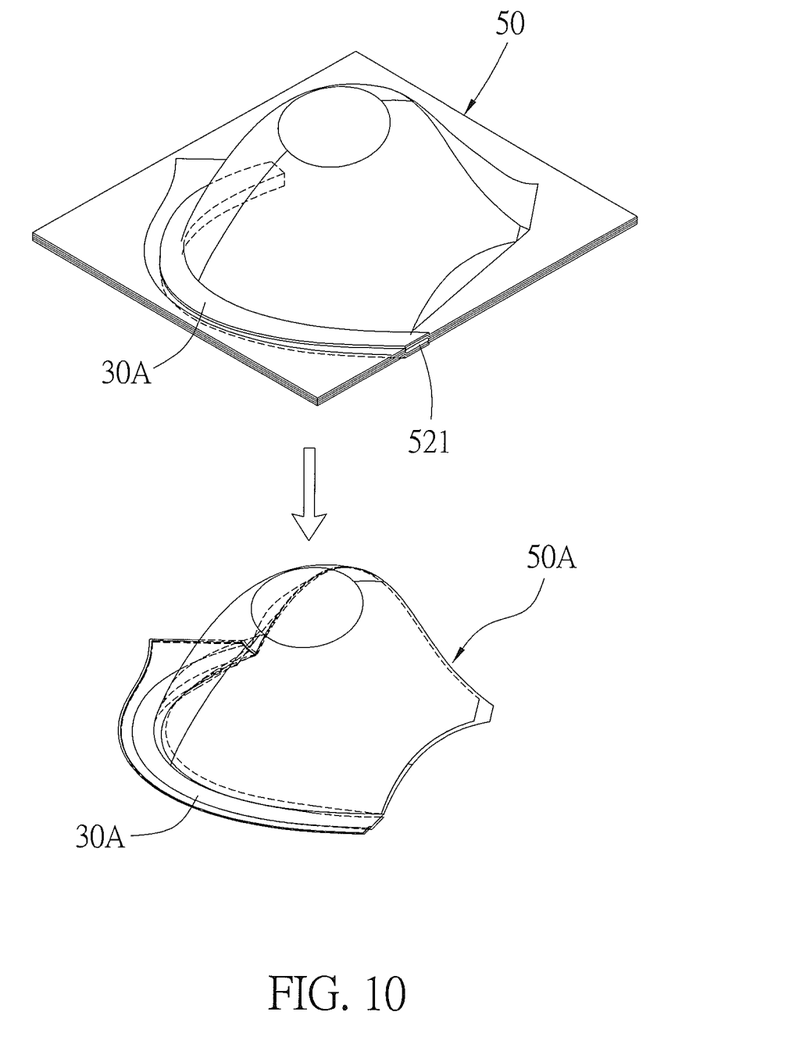
FIG. 10 is a perspective view showing step G of the method of forming the support of the bra cup in accordance with the preferred embodiment of the present invention.
Figure 11:
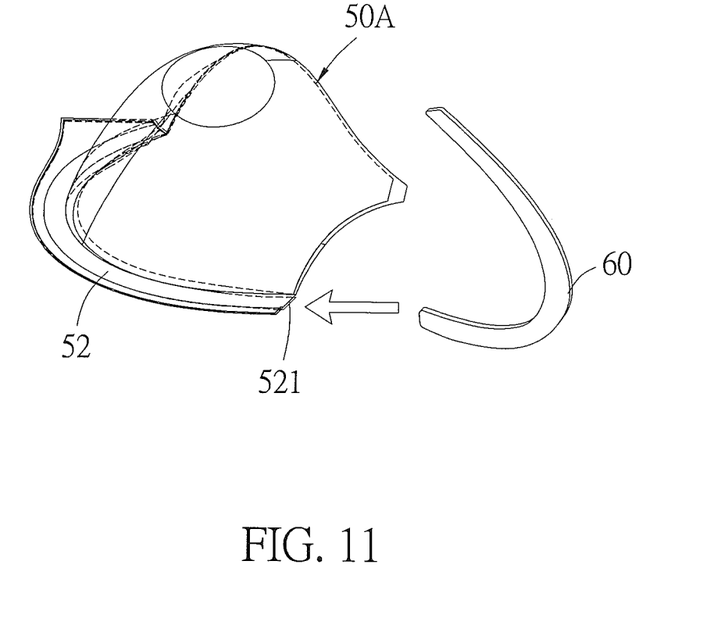
FIG. 11 is a perspective view showing step H of the method of forming the support of the bra cup in accordance with the preferred embodiment of the present invention.
Figure 12:
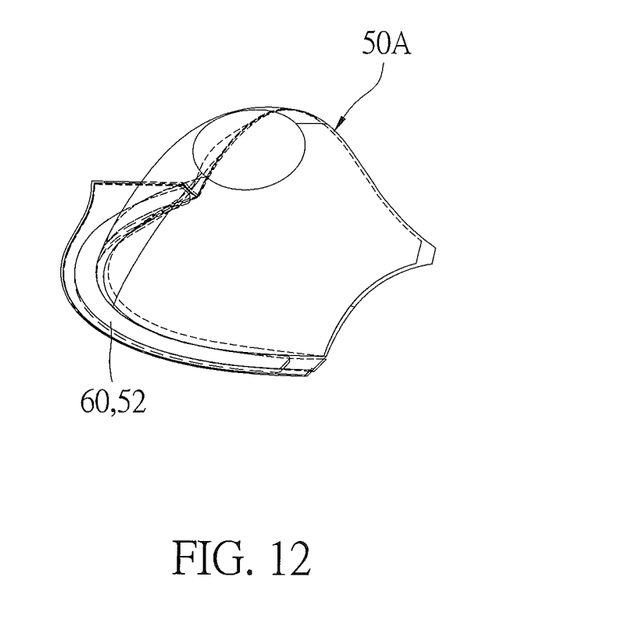
FIG. 12 is another perspective view showing step H of the method of forming the support of the bra cup in accordance with the preferred embodiment of the present invention.
Figure 13:
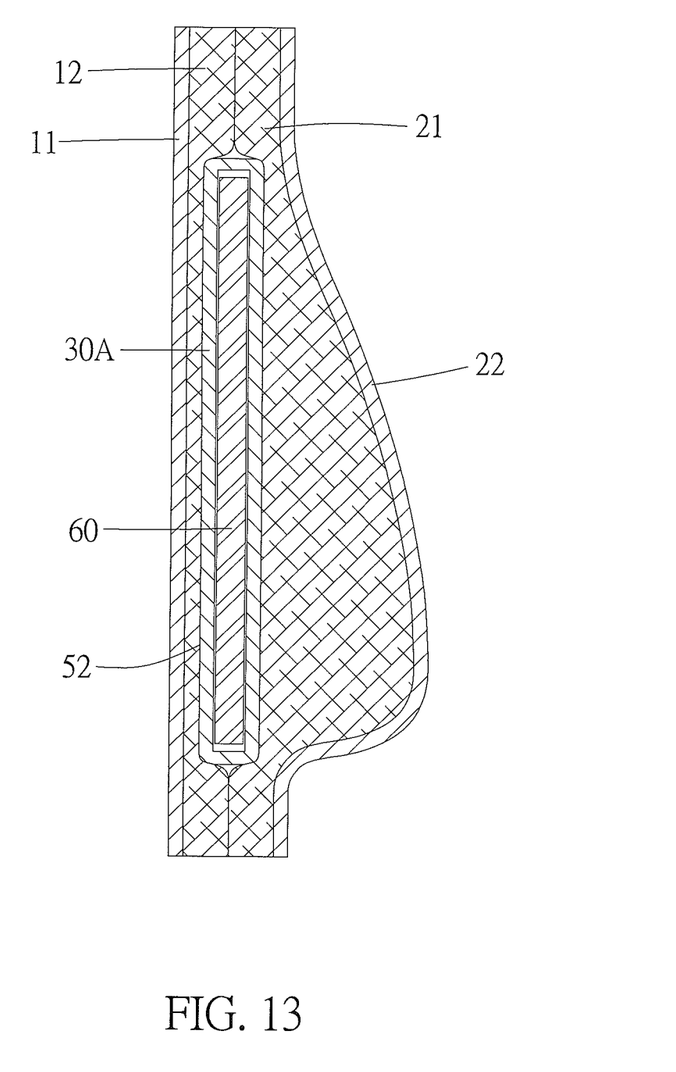
FIG. 13 is another cross sectional view showing the operation of the method of forming the support of the bra cup in accordance with the preferred embodiment of the present invention.

B. stacking the first thermoformed layer 12 of the first cup layer 10 and the second thermoformed layer 21 of the second cup layer 20 together, as illustrated in FIG. 2. The forming rib 30 is fixed between the first thermoformed layer 12 and the second thermoformed layer 21, and the covering layer 30A of the forming rib 30 is arranged in the first thermoformed layer 12 and the second thermoformed layer 21. Hence, the extension 31 of the forming rib 30 extends out of the first cup layer 10 and the second cup layer 20;

C. providing a forming mold 40, as shown in FIG. 3. The forming mold 40 includes a first part 41 and a second part 42. Each of the first part 41 and the second part 42 has a cavity 401 corresponding to a profile of a breast and has a trench 402 defined on a peripheral side of the cavity 401;

D. heating the forming mold 40 within 180 degrees to 185 degrees, as illustrated in FIGS. 3 and 4. The first cup layer 10, the second cup layer 20, and the forming rib 30 are stacked together and are mounted in the cavity 401 of each of the first part 41 and the second part 42. The forming mold 40 is then locked and presses the first cup layer 10 and the second cup layer 20 at a high temperature and pressure. The covering layer 30A of the forming rib 30 is covered between the first cup layer 10 and the second cup layer 20 and is connected with the first thermoformed layer 12 and the second thermoformed layer 21;

E. opening the forming mold 40, as shown in FIG. 5, to form a cup portion 51 and a semifinished part 50 of an arcuate underwire channel 52. The covering layer 30A of the forming rib 30 is accommodated in the underwire channel 52, and the extension 31 extends out of the underwire channel 52. The forming rib 30 is not removed from the semifinished part 50, as illustrated in FIG. 6;

F. removing the forming rib 30 out of the underwire channel 52 by pulling the extension 31 of the forming rib 30, as shown in FIGS. 7 and 8, to form a hollow space in the underwire channel 52 and an opening 521 on one side of the underwire channel 52, as illustrated in FIG. 9;

G. trimming the semifinished part 50 to form a finished cup 50A, as illustrated in FIG. 10;

H. inserting an underwire 60 into the underwire channel 52 to fix the underwire 60 in the finished cup 50A, as shown in FIGS. 11 and 12. Hence, the underwire 60 supports a bottom of the underwire channel 52. The underwire 60 is made of steel or fiber-reinforced plastic (FRP). A cross section of the forming rib 30 is greater than the underwire 60, so that after the underwire 60 is inserted into the underwire channel 52, a depth of the underwire channel 52 is more than a length of the underwire 60. Referring to FIG. 13, the underwire channel 52 of the finished cup 50A accommodates the underwire 60;

I. closing the opening 521 of the underwire channel 52, after inserting the underwire 60 into the underwire channel 52; and J. finishing the bra cup, as shown in FIGS. 12 and 13.

Figure 14:
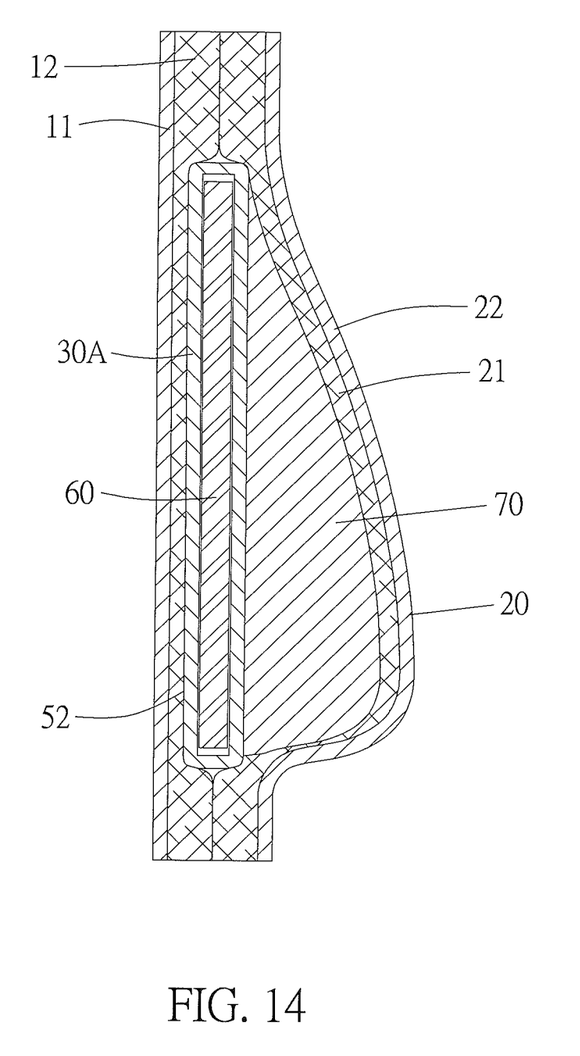
FIG. 14 is a cross sectional view showing the operation of a method of forming a support of a bra cup in accordance with another preferred embodiment of the present invention.

With reference to FIG. 14, the underwire channel 52 has flexible padding 70 mounted therein and between the second cup layer 20 and the underwire 60. The flexible padding 70 is made of flexible material, such as silicone rubber.

Accordingly, the underwire channel 52 with the opening 521 is located on a bottom of the finished cup 50A, and the underwire 60 is inserted into the underwire channel 52 in any manufacturing process, so that the bra cup passes customs inspection. Preferably, the underwire 60 made of the steel or the fiber-reinforced plastic (FRP) is replaceable based on using requirements.

While various embodiments in accordance with the present invention have been shown and described, it is clear to those skilled in the art that further embodiments may be made without departing from the scope of the present invention.

What is claimed is:

1. A method of forming an underwire channel of a bra cup comprising:

A. providing a first cup layer, a second cup layer, and a channel forming rib, wherein the first cup layer includes a surface cloth and a first thermoformed layer, wherein the second cup layer includes a second thermoformed layer and a lining cloth, wherein the first thermoformed layer and the second thermoformed layer are made of material to be flexible when heated and to be shaped when cooled, wherein the channel forming rib is arcuate and includes an extension extending outwardly from one end thereof, wherein the channel forming rib also includes a covering layer corresponding to a profile of the channel forming rib;

B. stacking the first thermoformed layer of the first cup layer and the second thermoformed layer of the second cup layer together, wherein the channel forming rib is fixed between the first thermoformed layer and the second thermoformed layer, and wherein the extension of the channel forming rib extends out of the first cup layer and the second cup layer;

C. providing a breast cup forming mold, wherein the breast cup forming mold includes a first part and a second part, wherein each of the first part and the second part has a cavity corresponding to a profile of a breast and has a trench defined on a peripheral side of the cavity;

D. heating the breast cup forming mold, wherein the first cup layer, the second cup layer, and the channel forming rib are stacked together and are mounted in the cavity of each of the first part and the second part, wherein the breast cup forming mold is then locked and presses the first cup layer and the second cup layer at a temperature and a pressure to form a cup portion having an arcuate underwire channel, and wherein the covering layer corresponding to the profile of the channel forming rib is covered between the first cup layer and the second cup layer and is connected with the first thermoformed layer and the second thermoformed layer;

E. opening the breast cup forming mold and removing the cup portion including the arcuate underwire channel, wherein the covering layer corresponding to the profile of the channel forming rib is accommodated in the underwire channel, wherein the extension extends out of the underwire channel;

F. removing the channel forming rib out of the underwire channel by pulling the extension of the channel forming rib to form a hollow space in the underwire channel and an opening on one side of the underwire channel; and G. trimming the cup portion to form a finished bra cup.

2. The method of forming the underwire channel of the bra cup as claimed in claim 1, wherein after trimming, an underwire is inserted into the underwire channel to fix the underwire in the finished bra cup, wherein the underwire supports a bottom of the underwire channel, wherein a cross section of the channel forming rib is greater than a cross section of the underwire so that after the underwire is inserted into the underwire channel, a depth of the underwire channel is more than a length of the underwire.

3. The method of forming the underwire channel of the bra cup as claimed in claim 2, wherein the opening of the underwire channel is closed, after inserting the underwire into the underwire channel.

4. The method of forming the underwire channel of the bra cup as claimed in claim 2, wherein the underwire is made of steel or fiber-reinforced plastic (FRP).

5. The method of forming the underwire channel of the bra cup as claimed in claim 1, wherein the underwire channel has flexible padding mounted therein and between the second cup layer and the underwire.

6. The method of forming the underwire channel of the bra cup as claimed in claim 5, wherein the flexible padding is made of silicone rubber.

7. The method of forming the underwire channel of the bra cup as claimed in claim 5, wherein the first thermoformed layer and the second thermoformed layer are made of foam or cotton fiber.

* * * * *